Aug. 7, 1928.
A. J. EASON
1,679,963
CAR SEAL
Filed Nov. 10, 1926
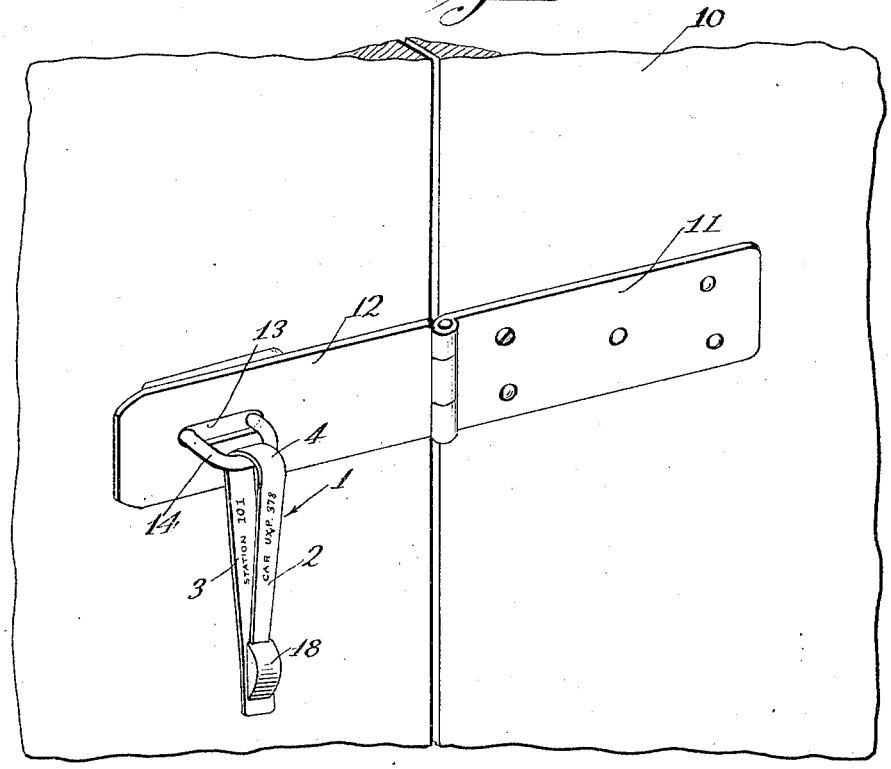
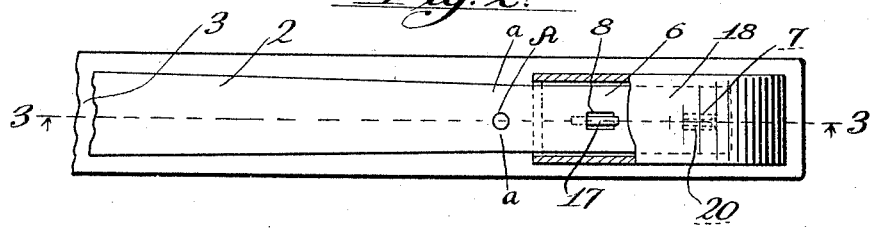
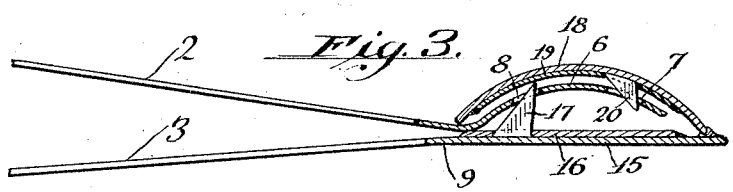
Inventor.
Andrew J. Eason,
by Hazard and Miller
Attorneys Patented Aug. 7, 1928.

1,679,963

UNITED STATES PATENT OFFICE.

ANDREW J. EASON, OF SAN BERNARDINO, CALIFORNIA.

CAR SEAL.

Application filed November 10, 1926. Serial No. 147,452.

This invention relates to car seals and particularly to seals which are adapted to close the doors on freight or refrigerating cars and seal the same until access thereto is again desired. These seals are furthermore adapted to be used on boxes, chests and packages of all descriptions and are particularly useful to railroad companies, freight offices and parcel checking establishments.

An object of this invention is to provide a seal which will effectively seal such doors, boxes and the like and which cannot be tampered with without detection.

Another object of this invention is to provide a car seal which can be used but once and which must be completely destroyed upon opening of the door.

A further object of this invention is to provide a seal which is simple and which may be manufactured cheaply, yet which is durable and which will well serve the purpose for which it is fitted.

With the foregoing and other objects in view which will be made manifest in the following detailed description and specifically pointed out in the appended claims, reference is had to the accompanying drawings for an illustrative embodiment of the invention, wherein:

Figure 1 is a perspective view of my device as applied to the lock of a car door.

Fig. 2 is a detail view partly in section of my device in its locked relationship, and Fig. 3 is a side elevation in section taken on the line 3—3 of Fig. 2.

Referring to the accompanying drawings wherein similar reference characters designate similar parts throughout, I have shown a car door at 10. I do not desire to limit myself particularly to the use of my invention in connection with sealing a car door, as I contemplate using the same for sealing boxes, packages and the like. Securely fastened to the door is a conventional type of hinge latch having a plate member 11 and a latch member 12. This latch member has an aperture 13 therethrough which is adapted to be inserted over a staple 14 or the like.

My seal comprises a U-shaped member 1 adapted to have one of its arms 2 and 3 inserted through the staple 14 after the latch member is closed thereupon. The arms 2 and 3 are formed of resilient sheet metal and are bent as shown at 4. One of these arms has a curved outer portion 6. This portion has a plurality of apertures 7 and 8 extending therethrough. The other of these arms is bent as at 9 to provide a flat portion 15 to which is secured by means of soldering, brazing, welding or in any other suitable manner a plate 16 having an upstruck tongue 17, which together with the aperture 8 forms a latch member.

A curved plate 18 is rigidly secured to the flat portion 15 and overlies the same. This plate is secured at its outer and side edges to the plate 15 and is adapted to have the curved portion 6 inserted therebeneath. Fastened to the under side of the plate 18 by welding, brazing or in any other suitable manner is a second curved plate 19 having an upstruck tongue 20, which together with the aperture 7 is adapted to form a second latch member. I have particularly chosen to use the welding or brazing operation in securing the overlying plate in position, as the welding operation forms a joint which cannot be tampered with and is much more effective than the soldering operation. When the arm 2 is inserted beneath the plate 18 the apertures 7 and 8 engage the upstruck portions 17 and 20 so that the arm 2 cannot be removed from beneath the plate 18. This forms an effective closed seal for doors, and in order to have access to the sealed car, it is necessary to break the seal or cut the same before the door may be opened.

When the arm 2 is inserted beneath the overlying plate 18, as a further protective means, I contemplate striking the plate 18 a sharp blow with a hammer to bring the upstruck portions 17 and 20 into contact, through the apertures, with the opposite walls of the chamber, and when this has been done it is impossible to effectively tamper with the seal.

In order to prevent substitution of seals I have shown the flat resilient portion of the seal 1 stamped with the station and car number thereon. It is obvious that any suitable identification may be stamped on the seal to prevent substitution of seals.

Indicated at A is an aperture which provides weakened portions $a$ which are adapted to act as breaking points. This is an additional preventive measure.

It will be understood that various changes may be made in the detail of construction without departing from the spirit and scope of the invention as defined by the appended claims.

I claim:

1. A seal for car doors comprising a U-shaped member of flat resilient material, one of the arms of said member having a curved outer portion, said portion having apertures therethrough, the other arm being bent to provide a flat portion, a plate having an upstruck tongue fastened to said flat portion, a curved plate having three adjacent edges fastened to said flat portion and overlying the same, a second curved plate having an upstruck tongue secured to the under side of the first mentioned curved plate, said curved plates being adapted to have the curved portion of said first mentioned arm inserted therebeneath, said upstruck tongues being adapted to engage in said apertures to prevent removal of said arm from beneath said curved plates.

2. A seal for car doors comprising a U-shaped member of flat resilient material, one of the arms of said member being provided with apertures adjacent its outer end, the other arm having a curved plate overlying the same and adapted to have the end of the first mentioned arm inserted therebeneath, a plate having an upstruck portion fastened to said second mentioned arm, a second plate having an upstruck portion fastened to said overlying plate, said upstruck portion being adapted to engage said apertures, whereby said arms may be held in locked relation.

3. A seal comprising a U-shaped member bent upon itself to provide a pair of arms, one of said arms having apertures in the end thereof, a plate having an upstruck tongue fastened to the other of said arms adjacent the outer end thereof, a plate having three adjacent edges fastened to said last mentioned arm and overlying the same, a third plate having an upstruck tongue secured to the under side of said overlying plate, said overlying plate and plate secured thereto being adapted to have said first mentioned arm inserted therebeneath, said upstruck tongues being adapted to engage said apertures to prevent removal of said arm from beneath said overlying plate.

In testimony whereof I have signed my name to this specification.

ANDREW J. EASON.